United States Patent
German et al.

(10) Patent No.: US 11,621,742 B2
(45) Date of Patent: Apr. 4, 2023

(54) SYSTEMS AND METHODS FOR AUTOMATED NETWORK CABLING INTEGRITY MONITORING

(71) Applicant: CommScope Technologies LLC, Hickory, NC (US)

(72) Inventors: Michael Gregory German, Secaucus, NJ (US); Marta Beatriz Ripa, Fort Lauderdale, FL (US); Chichuan Lin, Plano, TX (US); Shawn M. Clark, Crowley, TX (US); Ryan E. Enge, Carrollton, TX (US); Rishipal Arya, San Jose, CA (US)

(73) Assignee: CommScope Technologies LLC, Hickory, NC (US)

( * ) Notice: Subject to any disclaimer, the term of this patent is extended or adjusted under 35 U.S.C. 154(b) by 191 days.

(21) Appl. No.: 17/283,373

(22) PCT Filed: Sep. 26, 2019

(86) PCT No.: PCT/US2019/053227
§ 371 (c)(1),
(2) Date: Apr. 7, 2021

(87) PCT Pub. No.: WO2020/091918
PCT Pub. Date: May 7, 2020

(65) Prior Publication Data
US 2021/0384941 A1 Dec. 9, 2021

Related U.S. Application Data

(60) Provisional application No. 62/753,422, filed on Oct. 31, 2018.

(51) Int. Cl.
*H04B 3/46* (2015.01)

(52) U.S. Cl.
CPC .................................. *H04B 3/46* (2013.01)

(58) Field of Classification Search
CPC ................................. H04B 3/46; H04L 25/08
See application file for complete search history.

(56) References Cited

U.S. PATENT DOCUMENTS

| 7,719,992 B1 | 5/2010 | Gourlay et al. |
| 8,798,456 B2 * | 8/2014 | Skirmont ........... H04B 10/0779 398/19 |

(Continued)

FOREIGN PATENT DOCUMENTS

| JP | 2015515784 A | 5/2015 |
| KR | 1020060126619 A | 12/2006 |

OTHER PUBLICATIONS

International Searching Authority, "International Search Report and Written Opinion from PCT Application No. PCT/US2019/053227", dated Jan. 14, 2020, pp. 1 through 9, Published: WO.

(Continued)

*Primary Examiner* — Khanh C Tran
(74) *Attorney, Agent, or Firm* — Fogg & Powers LLC

(57) ABSTRACT

Systems and methods for automated network cabling integrity monitoring are provided. In one embodiment a system manager for a network that includes a network switch coupled to patching equipment comprises: at least one processor configured to execute software, the software comprising a network integrity monitor. The network integrity monitor controls a cable diagnostic test function to obtain a fault-distance measurement for a port of the switch. The network integrity monitor correlates the fault-distance measurement with network cable length information associated with the switch port to identify one or both of a network cable segment associated with the fault-distance measurement and a fault location. The cable length information is retrieved from a database. The network integrity monitor (Continued)

produces an output identifying of one or both of the network cable segment associated with the fault-distance measurement and the fault location to be displayed on a display device.

39 Claims, 7 Drawing Sheets

(56) References Cited

U.S. PATENT DOCUMENTS

| | | | |
|---|---|---|---|
| 9,417,279 B2* | 8/2016 | Incarbone | G01R 31/083 |
| 9,602,197 B2* | 3/2017 | Pham | H04B 10/0773 |
| 9,678,133 B2 | 6/2017 | Enge | |
| 2004/0013178 A1 | 1/2004 | Bui et al. | |
| 2007/0022331 A1* | 1/2007 | Jamieson | G06F 11/0709 |
| | | | 714/E11.207 |
| 2012/0306895 A1* | 12/2012 | Faulkner | H04B 3/46 |
| | | | 379/27.01 |
| 2013/0271151 A1 | 10/2013 | Breed et al. | |
| 2015/0222511 A1* | 8/2015 | Fertner | H04L 43/0864 |
| | | | 370/252 |
| 2015/0334166 A1* | 11/2015 | Warden | H04L 63/20 |
| | | | 709/217 |
| 2017/0302504 A1* | 10/2017 | Wang | H04L 41/069 |
| 2018/0027113 A1 | 1/2018 | Mohseni et al. | |
| 2018/0114382 A1 | 4/2018 | Courier et al. | |

OTHER PUBLICATIONS

European Patent Office, "Extended European Search Report from EP Application No. 19879739.1", from Foreign Counterpart to U.S. Appl. No. 17/283,373, dated Apr. 20, 2022, pp. 1 through 9, Published: EP.

* cited by examiner

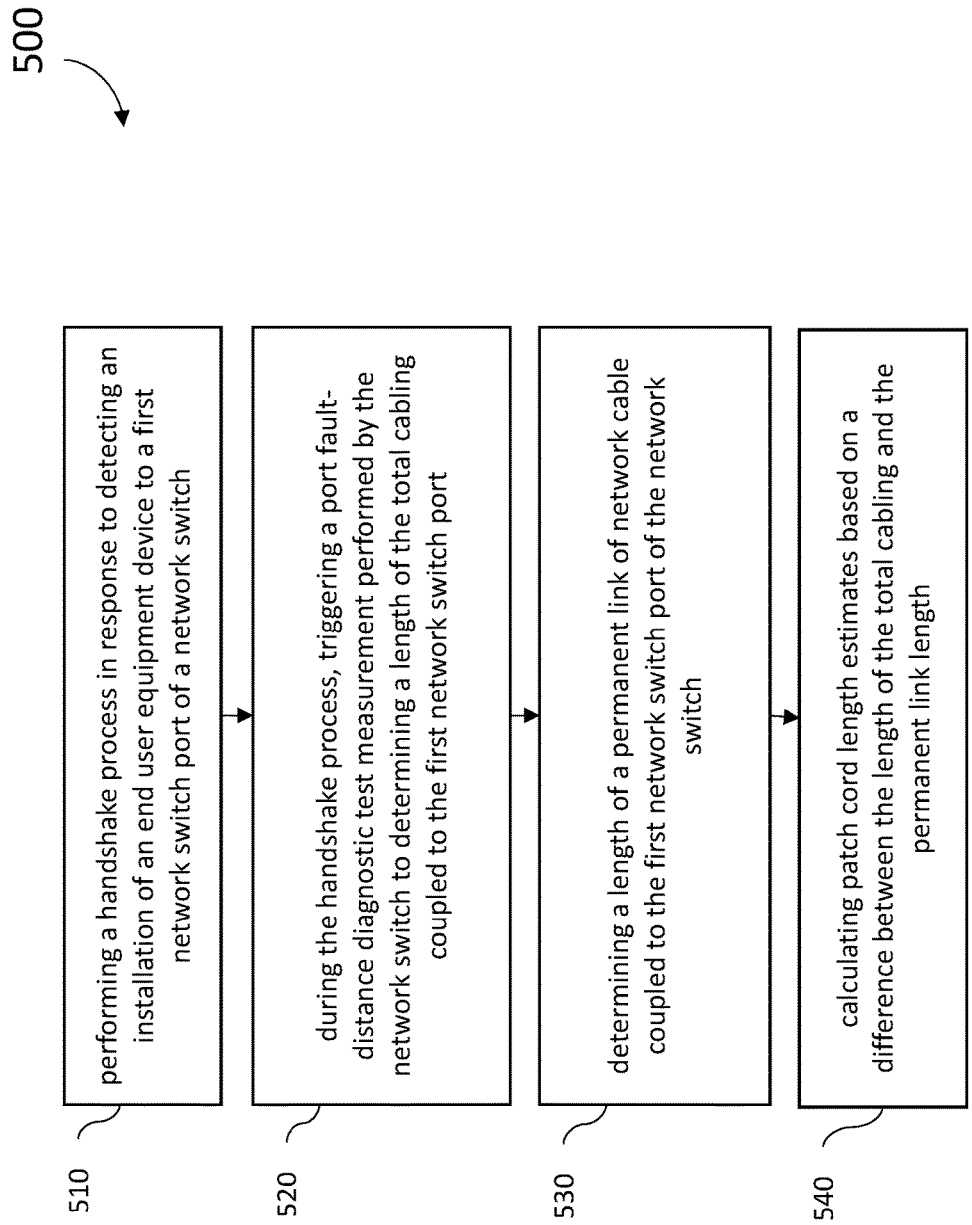

SYSTEMS AND METHODS FOR AUTOMATED NETWORK CABLING INTEGRITY MONITORING

CROSS-REFERENCE TO RELATED APPLICATIONS

This patent application is a U.S. national stage 371 application of International Patent Application No. PCT/US2019/053227 filed on 26 Sep. 2019, which claims priority to, and the benefit of, United Stated Provisional Patent Application No. 62/753,422, titled "SYSTEMS AND METHODS FOR AUTOMATED NETWORK CABLING INTEGRITY MONITORING" filed 31 Oct. 2018, which are each incorporated by reference in their entirety.

BACKGROUND

Many network installations, such as used in datacenters, office buildings, and other facilities, may include network switches that comprise built in functionality for detecting cable faults in network cables. Cable faults are often the result of inadvertent or unscheduled cable disconnections but may also be the result of cable damage or degradation. Diagnostic test functionalities, such as those that provide Time Domain Reflectivity (TDR) testing, may be integrated into network switch ports and used to determine the length of cable between a network switch port where the cable is connected, and the point on the cable where a fault has occurred. However, because network cables may be routed in complex paths through walls, across ceilings over ceiling tiles or laid in cable trays, knowing a linear distance in terms of a cable length to a fault can be of limited utility in actually pinpointing the physical location within a facility to send a technician so that they may investigate and clear the fault condition by reconnecting, repairing, or replacing the network cable.

SUMMARY

The embodiments of the present disclosure provide methods and systems for automated network cabling integrity monitoring and will be understood by reading and studying the following specification.

In one embodiment a system manager for a network that includes a network switch coupled to a first item of patching equipment comprises: at least one processor configured to execute software, the software comprising a network integrity monitor; wherein the network integrity monitor controls a cable diagnostic test function to obtain a fault-distance measurement for a first switch port of the network switch; wherein the network integrity monitor correlates the fault-distance measurement with network cable length information associated with the first network switch port to identify one or both of a network cable segment associated with the fault-distance measurement and a fault location; wherein the network cable length information is retrieved from a cabling information database; and wherein the network integrity monitor produces an output identifying of one or both of the network cable segment associated with the fault-distance measurement and the fault location to be displayed on a display device.

DRAWINGS

Embodiments of the present disclosure can be more easily understood and further advantages and uses thereof more readily apparent, when considered in view of the description of the preferred embodiments and the following figures in which:

FIG. 5 is a flow chart illustrating another example method embodiment.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized, and that logical, mechanical and electrical changes may be made without departing from the scope of the present disclosure. The following detailed description is, therefore, not to be taken in a limiting sense.

Figure 1:
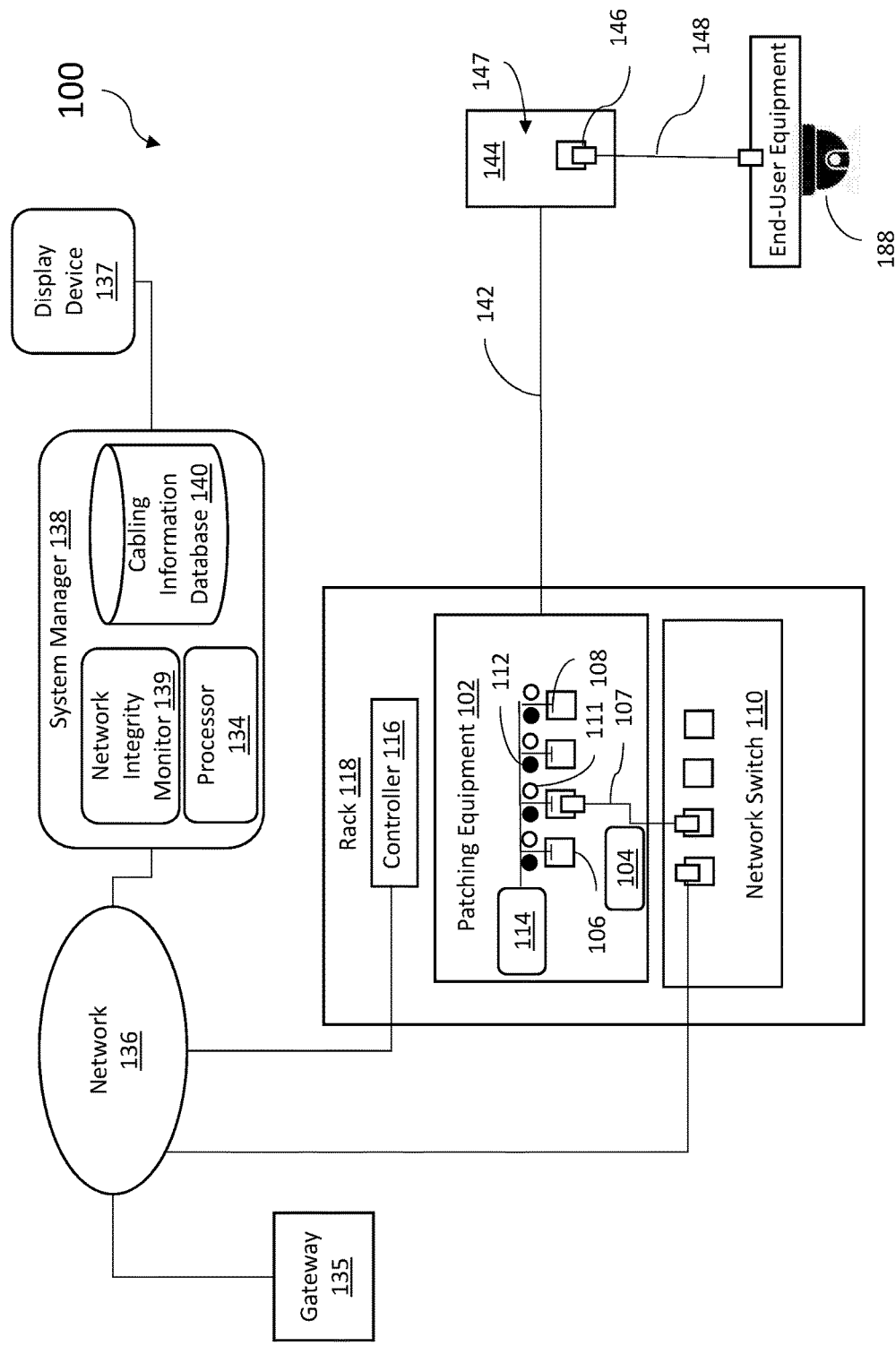
FIG. 1 is a diagram of one exemplary embodiment of a network management system.

FIG. 1 is a block diagram of one exemplary embodiment of a network management system 100 that is configured to determine location of network cable disconnects and other cable faults. The system 100 shown in FIG. 1 can be implemented in a data center or enterprise application. Other embodiments can be implemented in other ways (for example, where the system 100 is implemented in a central office or other facility of a telecommunication service provider and/or in another part of the telecommunication service provider's network).

System 100 includes a network switch 110 coupled to a network 136. In this exemplary embodiment, the network 136 is implemented as an ETHERNET LAN and, as a result, the network switch 110 comprises an ETHERNET interface for communicating with the network 136. In some embodiments, network 136 may be connected to other networks, such as the public Internet for example, by a gateway 135. The network switch 110 is further coupled to at least one item of patching equipment 102 (such as patch panels). In some embodiments, the patching equipment 102 is deployed in a rack 118 along with network switch 110 or other items of equipment (not shown) (such as servers and routers, for example). In the example shown in FIG. 1, the patching equipment 102 is shown as having four ports 106. However, it is to be understood that this is for the purposes of illustration and that the patching equipment 102 can include a different number of ports 106.

As shown in FIG. 1, in this exemplary embodiment, for at least some of the patching equipment 102, fixed cables 142, also referred to later herein as "permanent links 142" are connected to the back of the patching equipment 102 (for example, using punch-down blocks). The patching equipment 102 is configured so that each port 106 on the front of the patching equipment 102 is connected to at least one fixed cable 142 on the back of the patching equipment 102 in order to establish a communication path between that port 106 and the at least one fixed cable 142. The other end of each fixed cable 142 is terminated at a network outlet assembly (referred to herein generally as "outlet assembly" 144). For example, the outlet assembly 144 may comprises a wall, ceiling or floor outlet that is deployed in a worked area, a consolidation point (sometimes referred to as a Multi-User Telecommunications Outlet, or MUTOA), or another item of patching equipment. Also, for ease of explanation, only a single fixed cable 142 and outlet assembly 144 is shown in FIG. 1. However, it is to be understood that multiple fixed cables 142 and outlet assemblies 144 (of various types) coupled to other ports 106 of patching equipment 102 can and typically would be used.

Each outlet assembly 144 typically includes one or more ports 146. For example, where the outlet assembly 144 is a wall outlet as shown in FIG. 1, the wall outlet assembly 144 includes one or more ports 146 on the front of the outlet assembly 144 which may be used by end user equipment 188 to connect with network 136. In example shown in FIG. 1, the outlet assembly 144 is shown as having one port 146. However, it is to be understood that this is for the ease of illustration and that the outlet assembly 144 can include a different number of ports 146. In the example shown in FIG. 1, each outlet assembly 144 can also comprise a faceplate 147 to which the one or more ports 146 are mounted. The outlet assemblies 144 can be implemented in other ways. Where the outlet assembly 144 is a consolidation point, the consolidation point 144 includes multiple ports 146 where respective fixed cables 142 can be terminated at the rear of the ports 146 and other cables can be connected to the front of the ports 146, where each of those other cables can be terminated at its other end in the work area (for example, at a wall outlet). Where the outlet assembly 144 is another item of patching equipment, that other item of patching equipment also includes multiple ports where the relevant fixed cable 142 can be terminated at the rear of one of the ports 146 and other cables can be connected to the front of that port 146.

Figure 2:
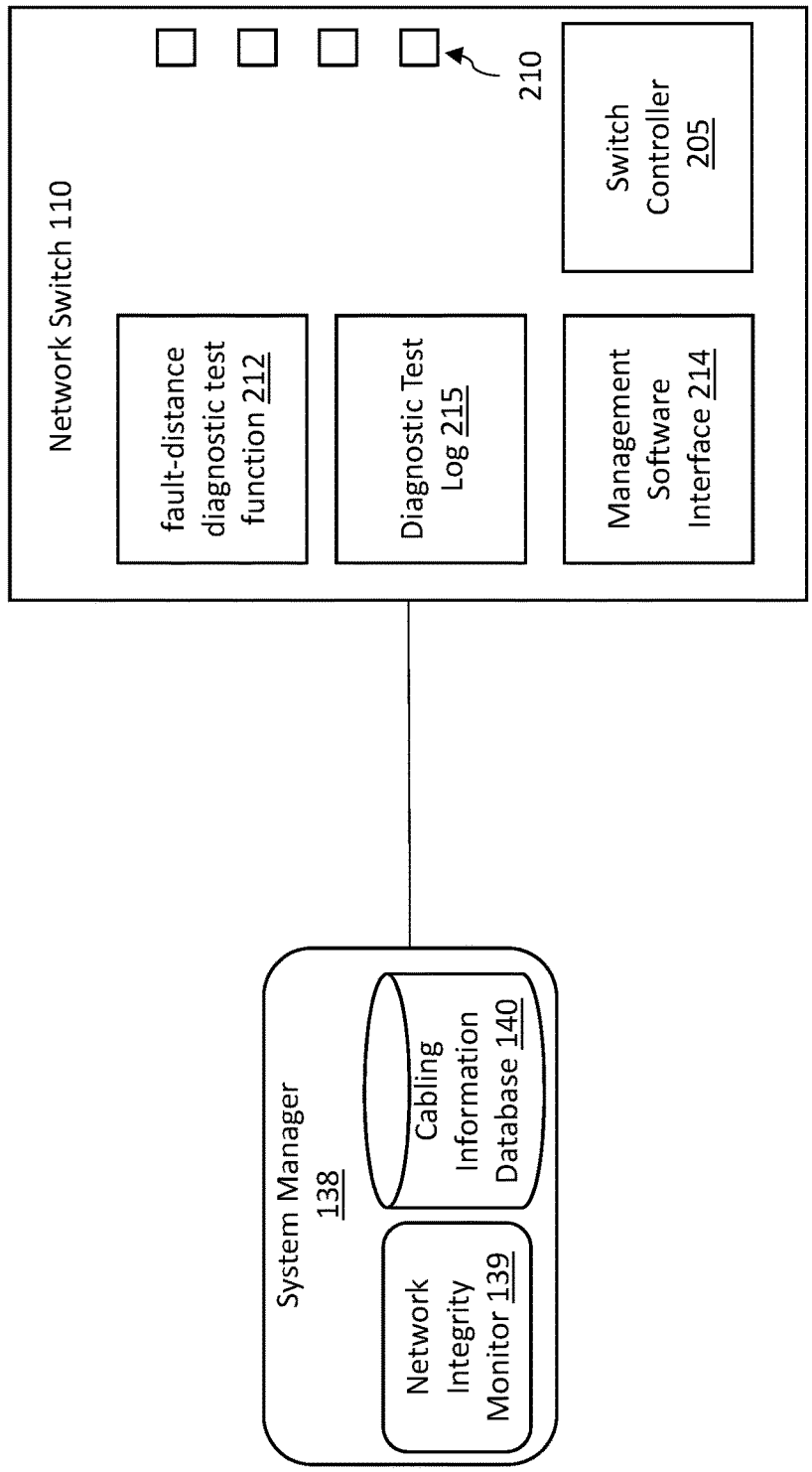
FIG. 2 is a diagram of a one exemplary embodiment of a network switch for performing diagnostic testing of the present disclosure.

FIG. 2 is a diagram of a network switch 110 of one embodiment of the present disclosure which may be used as network switch 110 in conjunction with the network management system 100 illustrated in FIG. 1, though it is to be understood that other embodiments can be implemented in other ways. For example, in some embodiments either cross-connect or interconnect topologies may be utilized. Network switch 110 includes a plurality of switch ports 210. The switch ports 210 may be used, for example, for interconnecting the network switch 110 with the ports 106 of patching equipment 102 and with network 136. Functions for operating as a network switch, including the switching of packets between the ports 210, may be implemented by a switch controller 205. The switch controller 205 may comprise a processor coupled to a memory comprising code executed by the processor to perform the various functions of the network switch 110 described herein. As shown in FIG. 2, network switch 110 further comprises a cable diagnostic test function 212. The cable diagnostic test function 212 may comprise software executed by the switch controller 205 and/or a test circuit for selectively generating a fault-distance diagnostic test signal at one of the switch ports 210 and evaluating the return of a corresponding reflected signal on that port. From the corresponding reflected signal, cable length, connection status and/or fault status of network cabling connected to that port 210 can be determined.

For example, the cable diagnostic test function 212 may implement a Time Domain Reflectivity (TDR) test. The test function 212 would cause a test signal to be transmitted from a selected port 210 and then measure the elapsed time until a reflection of test signal is received back at that port 210. Other measured parameters of the reflected signal may include, for example amplitude, phase shift and/or other characteristics. Based on the results of fault-distance diagnostic testing, the network switch 110 can determine; 1) whether or not a network port 210 is vacant or conversely coupled to a cable, 2) whether cabling coupled to that port 210 is terminated or unterminated, and in either case the length of cabling connected to that port, and 3) the presence of, and distance to, a fault that may exists on the length of cabling coupled to the port 210. While TDR is one specific example of a fault-distance diagnostic test, other distance-to-fault measurements techniques may instead be used by test function 212 such as but not limited to frequency domain fault-distance diagnostic tests that can measure the distance to a detected fault. Regardless of the specific fault-distance diagnostic test performed, when a diagnostic test is performed by the cable diagnostic test function 212 the measurement results may be entered into a diagnostic test log 215 which may be stored in a memory of the network switch 110. Network operators may initiate such tests, and obtain the results, by accessing a management software interface 214 to the network switch 110. For example, in one embodiment the management software interface 214 provides a Simple Network Management Protocol (SNMP) interface, an HTTP web page portal, or other interface to which commands may be communicated to access and operate management functions of the network switch 110 (including triggering fault-distance diagnostic tests and receiving the results, as well as other functions such as communication link status for any of the ports 210).

In some embodiments, the network management system 100 may optionally further constitute, or function as, an automatic infrastructure management (AIM) system configured to track connections made at the patching equipment 102 as well as connections with the other equipment. In such embodiments, the network management system 100 is configured to work with patching equipment 102 that has AIM functionality 104 for tracking connections made at the ports 106 located on the front (or patching) side of the patching equipment 102. In such embodiments, the patching equipment 102 may be referred to here as "intelligent patching equipment" 102. For each port 106 of the associated item of intelligent patching equipment 102, the AIM functionality 104 comprises a sensor, reader, interface, or other circuitry (collectively referred to here as a "sensor") 108 for use in determining the presence of, and/or information from or about, a connector and/or cable attached to the associated port 106. In one aspect, for each port 106 of the associated item of intelligent patching equipment 102, the AIM functionality 104 further comprises one or more visual indicators 111 (such as one or more light emitting diodes (LEDs)) for providing a visual indication to a user, for example, to enable the user to visually identify that particular port 106. In one aspect, for each port 106 of the associated item of intelligent patching equipment 102, the AIM functionality 104 also comprises a respective user-input device 112 (such as a button) by which a user is able to select that port 106. The AIM functionality 104 can be implemented in many different ways and the particular configuration illustrated in FIG. 1 is merely exemplary and should not be construed as limiting. Each sensor 108, visual indicator 111, or user-input device 112 can be associated with a single port 106 or can be associated with multiple ports 106 (for example, these items can be associated with all of the ports 106 or with a subset of ports 106 such as a row or other grouping of ports 106). The sensor 108, visual indicator 111, button 112, and processor 114 can be natively integrated into the patching equipment 102 or can be packaged into a retrofit kit that can be installed on already deployed patching equipment 102.

Various types of AIM technology can be used. One type of AIM technology infers connection information by sensing when connectors are inserted or removed from ports. Another type of AIM technology makes use of so-called "ninth wire" or "tenth wire" technology. Ninth wire/tenth wire technology makes use of special cables that include one or more extra conductors or signal paths that are used for determining which port each end of the cable is inserted into. Yet another type of AIM technology makes use of an Electrically Erasable Programmable Read-Only Memory (EEPROM) or other storage device that is integrated with or attached to a connector on a cable. The storage device is used to store an identifier for the cable or connector along with other information. The port (or other connector) into which the associated connector is inserted is configured to read the information stored in the EEPROM when the connector is inserted into the front side of a port of a patch panel or other item of patching equipment. A similar approach can be used with optical machine-readable representations of data (such as barcodes or QR codes). Another type of AIM technology makes use of radio frequency identification (RFID) tags and readers. With RFID technology, an RFID tag is attached to or integrated with a connector on a cable. The RFID tag is used to store an identifier for the cable or connector along with other information. The RFID tag is typically then read using an RFID reader after the associated connector is inserted into a port (or other connector) of a patch panel or other item of patching equipment. Still other types of AIM technology can be used.

Each item of intelligent patching equipment 102 may include a respective programmable processor 114 that is communicatively coupled to the other AIM functionality 104 in that item of patching equipment 102 and configured to execute software that reads or otherwise receives information from each sensor 108, controls the state of each visual indicator 111, and determines the state of each button 112. Some embodiments may include a controller 116 configured to be connected to, and manage, patching equipment 102 having AIM functionality 104 that is installed in one or more racks 118 and is also referred here as a "rack controller 116."

Each rack controller 116 aggregates connection information for the ports 106 of the patching equipment 102 in the associated racks 118 and configured to use the sensor 108 associated with each port 106 of the patching equipment 102 mounted in the associated rack 118 to monitor the state of each port 106 and identify connection or disconnection events occurring at that port 106 (for example, by detecting changes in the connection state of the port 106). As shown in FIG. 1, each rack controller 116 provides asset and connection information to a system manager 138. In one aspect, the system manager 138 includes a network integrity monitor 139 configured to compile asset and connection information and to provide an end-to-end trace of connections. The system manager 138 stores the asset and connection information in a database 140 coupled to the network integrity monitor 139.

For either an AIM or non-AIM implementation, embodiments of the preset disclosure combine utilization of fault-distance diagnostic test results with documented cabling information maintained for the network management system by system manager 138 and cabling information database 140. The system manager 138 and database 140 can be implemented using one or more computers (each comprising at least one processor and a memory) on which appropriate software is executed and may communicate with the network switch 110 over the management software interface 214 provided by the network switch 110.

As discussed above fixed cables 142 that are installed as part of a facility's permanent infrastructure are often referred to as "permanent links". That is, permanent link 142 comprise segment of network cabling that are installed in walls, ceiling, cable trays, and so forth, that are essentially permanent features of the facility. Permanent links 142 are not typically moved or re-routed as part of a routine network reconfiguration. Accordingly, a permanent link network cable may be considered in contrast to a "patch cord" network cable. For example, patching connections between switch 110 and patching equipment 102 are made using patch cords 107 that are connected between the ports 210 and 106. Patching connections between end-user devices 188 and port 146 (such as a wall, floor, or ceiling mounted network ports outlets, for example) are similarly made using patch cords 148.

When a permanent link 142 is first deployed, it is field tested to confirm the integrity of the physical cable and establish a length of the permanent link. For example, each connection between a port 106 of patching equipment 102 and a port 146 of the outlet assembly 144 (which includes the permanent link 142) is tested by technicians using cable testers. Among other things in addition to cable length, the technicians use the cable testers to verify the transmission performance requirements for the connection (for example, by verifying that the requirements specified in TIA/EIA TSB-67 are met). The technicians also verify that each such connection has been correctly established and labeled at the specified port 106 of the patching equipment 102 and at the specified port 146 of the outlet assembly 144. The length of each permanent link 142 as established by the field testing, a unique cable identifier (cable ID) associated with the cable, and other measurements obtained by field testing may be stored in the cable information database 140. For installations where a permanent link 142 comprises a series connection of two or more physical network cables, such as where a first fixed network cable segment connects the back of a port 106 of patching equipment 102 to a port of a consolidation point, from which a second fixed network cable segment connects that port of the consolidation point to a network outlet, field testing may be individually performed and recorded in database 140 for each segment. Database 140 may then include information indicating the individual segments are series linked to define one composite permanent link 142.

The network integrity monitor 139 is configured to access cable data from the cable information database 140 and to control the cable diagnostic test function 212, retrieve test results generated by the cable diagnostic test function 212, and to evaluate the rest results to make the determinations regarding cabling lengths, connection status, faults, and other parameters as described herein. The network integrity monitor 139 may be implemented as a software function through appropriate software executed by a processor 134 of the system manager 138.

Figure 3:
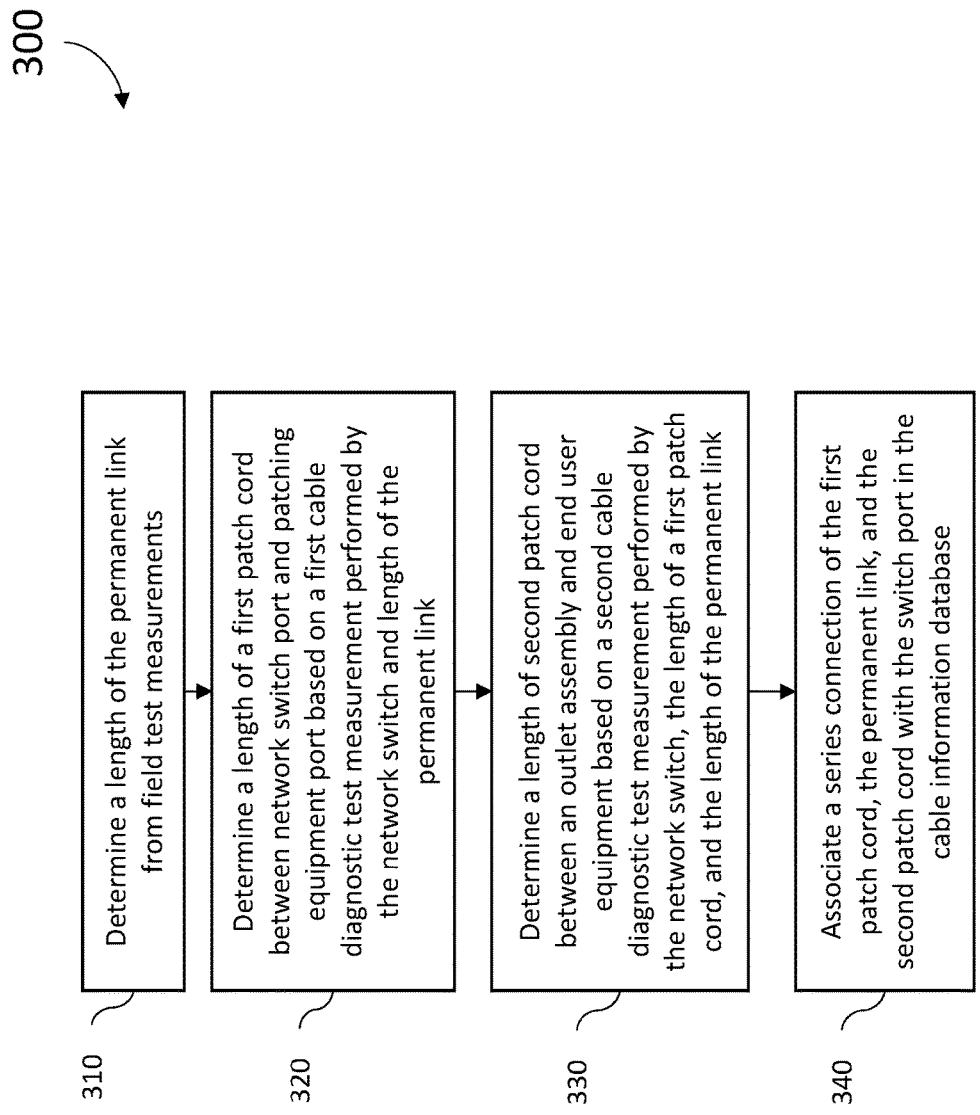
FIGS. 3 and 3A are a flow chart and diagram illustrating an example method embodiment.
Figure 3A:
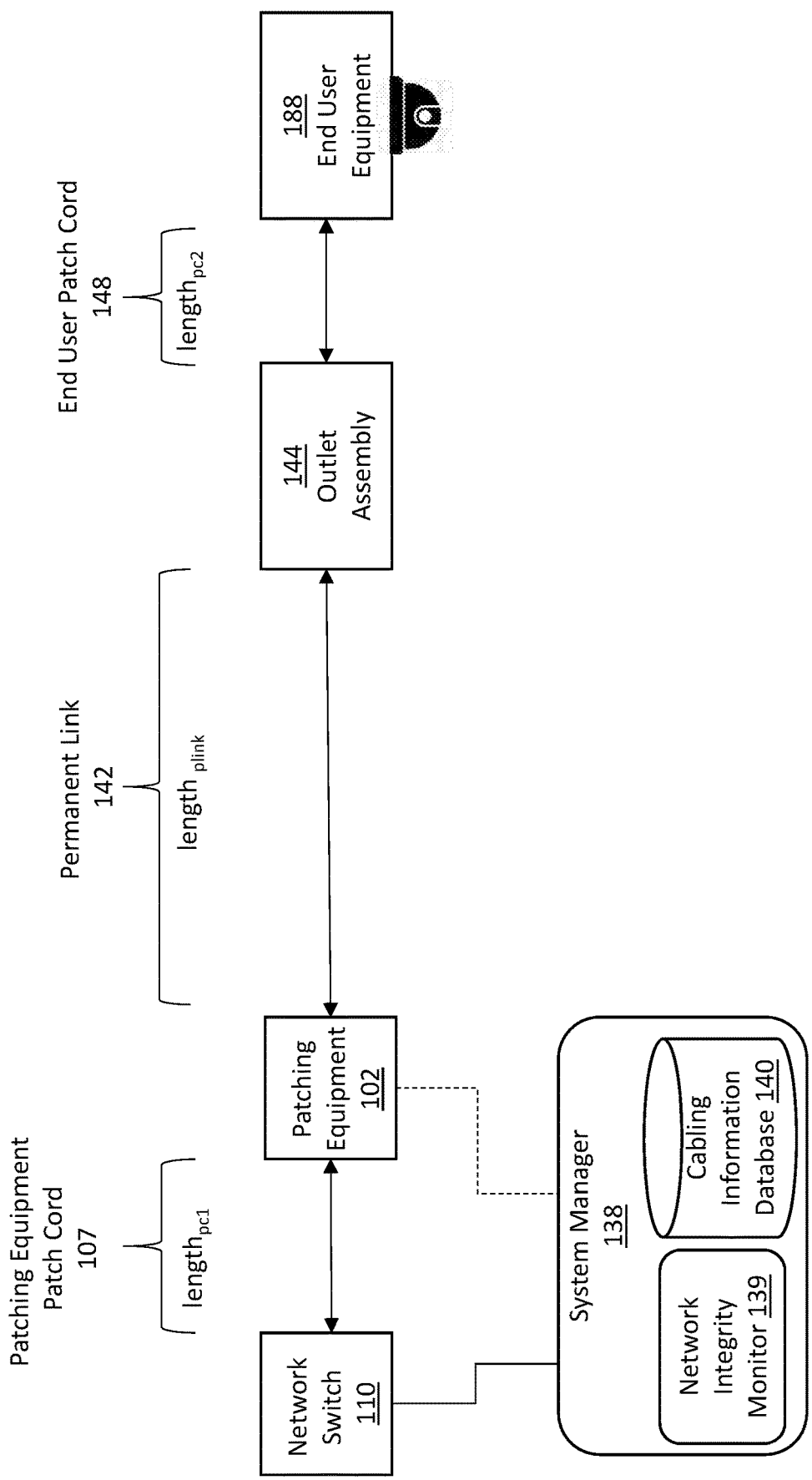

FIGS. 3 and 3A illustrate a process 300 which may be implemented by the network integrity monitor 139 in order to establish relevant cable lengths for both permanent links 142 and patch cables 107, 148 coupled to a port 210. It should be understood that the features and elements described herein with respect to the process 300 shown in FIGS. 3 and 3A and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIGS. 3 and 3A may apply to like named or described elements for any of the other figures and embodiments and vice versa. The information obtained from this process 300 may be used to populate the cable information database 140 by associating the relevant cable lengths with the port 210, and including an indication of the order in which the patch cables 107, 148 and permanent links 142 are series connected to the port 210.

The process begins as 310 with determining a length of a permanent link of network cable coupled to a port of a network switch. This length for the permanent link is shown in FIG. 3A as "$length_{plink}$" which spans the distance between the patching equipment 102 and outlet assembly 144. The length of the permanent link of network cable may be obtained from field test measurements performed at the time the permanent link was installed or based on field test measurements performed at another time. In some embodiments, the results of the field test measurements would be stored into the cabling information database 140 and therefore made accessible to the network integrity monitor 139. It should be understood that in cases where the permanent link 142 should comprise a plurality of series connected physical network cabling segments, each of those physical network cabling segments may be individually field tested and the results of those individual tests stored in the cabling information database 140. In such cases, the length for the permanent link ($length_{plink}$) determined at 310 may comprise the sum of the lengths of the plurality of series connected physical network cabling segments as determined by the field testing.

The process 300 proceeds to 320 with determining length of a first patch cord 107 installed between the network switch port and a patching equipment using a port fault-distance diagnostic test measurement performed by network switch. This length for the first patch cord is shown in FIG. 3A as "$length_{pc1}$" which spans the distance between the port of network switch 110 and patching equipment 102. To determine $length_{pc1}$ for patch cord 107, prior to the connection of the end-user patch cord 148 at outlet assembly 144, the network integrity monitor 139 transmits a test command to network switch controller 205 via the management software interface 214. The test command instructs the network switch controller 205 to execute the cable diagnostic test function 212 and may specify the specific port 210 of the network switch 110 that is to be tested. If different port fault-distance diagnostic test options are available, the test command may include which of those options are elected. For example, in some embodiments the cable diagnostic test function 212 may provide the option of performing either time domain fault-distance diagnostic tests or frequency domain fault-distance diagnostic tests, for example. In that case, the test command from the network integrity monitor 139 may specify whether a time or frequency domain fault-distance diagnostic test should be conducted. The test signal transmitted by the test function 212 would pass from the port 210 under test, through patch cord 107, through the corresponding port 106 of patching equipment 102, and through permanent link 142 to reach the distal end of the permanent link 142 at outlet assembly 144. From the reflected signal received back at the port 210 under test, the test function 212 determines the total length of network cabling currently coupled to the port 210. The network integrity monitor 139 can then query the results of this first cable diagnostic test from network switch controller 205 via the management software interface 214. With this information, the network integrity monitor 139 calculates the $length_{pc1}$ of the patch cord 107 based on the difference between this first measured total length of network cabling from this first diagnostic test, and the length for the permanent link $length_{plink}$ available from the cable information database 140. The calculated $length_{pc1}$ of the patch cord 107 is also stored into the cabling information database 140.

The process 300 proceeds to 330 where determining a length of a second patch cord 148 installed between the outlet assembly 144 and end user equipment 188 may be performed using a second fault-distance diagnostic test measurement. This length for the second patch cord 148 is shown in FIG. 3A as "$length_{pc2}$" which spans the distance between the port of the outlet assembly 144 and the network interface of the end user equipment 188. To determine $length_{pc2}$ for patch cord 148, after the connection of the end-user patch cord 148 at outlet assembly 144, the network integrity monitor 139 transmits a second test command to network switch controller 205 via the management software interface 214. The second test command again instructs the network switch controller 205 to execute the cable diagnostic test function 212, for the specific port 210. As with the first test comment at 320, the second test command may indicate elected test options. The test signal transmitted by the test function 212 passes from the port 210 under test, through patch cord 107, through the corresponding port 106 of patching equipment 102, through permanent link 142, and through the outlet assembly 144 to reach the distal end of the end user patch cord 148. Note that the distal end of the end user patch cord 148 may be, but is not necessarily, connected to the end user equipment 188 during execution of the process at 330. From the reflected signal received back at the port 210 under test, the test function 212 determines the total length of network cabling currently coupled to the port 210. The network integrity monitor 139 can then query the results of this second cable diagnostic test from network switch controller 205 via the management software interface 214. With this information, the network integrity monitor 139 now calculates the $length_{pc2}$ of the patch cord 148 based on taking the difference between the sum of $length_{plink}$+$length_{pc1}$ (now available from the cable information database 140) and the second measured total length of network cabling. The calculated $length_{pc2}$ of the patch cord 148 is also stored into the cabling information database 140.

The process 300 proceeds to 340 with associating a series connection of the first patch cord, the permanent link, and the second patch cord with the switch port in the cable information database 140. Once the lengths and associations are stored in the cable information database 140, network integrity monitor 139 may initiate subsequent test using the cable diagnostic test function 212 to monitor the integrity of network cabling coupled to the network switch 110. More specifically, diagnostic test measurements obtained using the cable diagnostic test function 212 may be correlated by the network integrity monitor 139 against the lengths of permanent links and patch cables stored in the cable information database 140 in order to determine the physical location of faults, which may include the inadvertent or unscheduled disconnection of network circuits. Similarly, conducting cable diagnostic test function 212 measurements may reveal the unscheduled connection of cables.

Different assessments may be performed by the network integrity monitor 139 depending on whether the port 210 being tested is an active network circuit (also referred to herein as a "link-up" connection") or an inactive network circuit (referred to herein as a "link-down" connection.) It should be understood that an active "link-up" link status as opposed to an inactive "link-down" link status referred to the status of data transportation through the network circuit between the switch port 210 and a network interface port at the end user equipment 188. In some embodiments, changes in the link status at a port, whether link-up to link-down, or link-down to link-up, may be detected by, or otherwise reported to, the system manager 138 in order to trigger activation of the test function 212. In some embodiments, the network integrity monitor 139 may periodically poll the management software interface 214 to check or confirm the link status at one or more ports 210 of the switch 110 and/or to activate the test function 212. In still other embodiments, the system manager 138 may query the management software interface 214 to check or confirm the link status at one or more ports 210 of the switch 110 and/or activate the test function 212 in response to other events. Such other events may include, for example, the reported completion of a work-order by a field technician or specific connect/disconnect steps of the work order, or calls into a help desk by end users experiencing difficulty with their network connection.

The system manager 138 may include or otherwise be coupled to a display device 137 through which a network operator or technician may access the network integrity monitory 139 to view the both link status information and cable diagnostic test function 212 results for any of the ports 210 of the network switch 110.

As explained below, in some embodiments, the network integrity monitor 139 may cause a graphical representation of a cable route for an identified network cable segment to be displayed on display device 137, and the graphical representation may be used to graphically indicate a fault location on the graphic representation of the cable route based on the fault-distance measurement. In some embodiments, the display device 137 may comprise a hand-held or otherwise mobile device wirelessly coupled to the system manager and carried, for example by a network technician. Information displayed on the display device 137 may be provided as a time correlated log listing the time of the link status change and/or diagnostic test. Alternately, the display device 137 may graphically display the connectivity of cabling (if any) and user equipment (if any) that should be connected to the port 210 per the cabling information database 140, along with link status, and highlight the estimated location of any fault or other anomaly indicated from the results of measurements obtained by the cable diagnostic test function 212. For example, network elements such as the switch 110, patching equipment 102, outlet assembly 144 and user equipment 188 may be represented by the system manager 138 on the display device 137 using icons. Relevant information may be displayed within or next to each icon such as the location where that network element is located (e.g. building, floor, room, rack, rack position) and equipment ID (e.g. switch number, panel number, faceplate number). In some embodiments, particular services carried by that network circuit (such as VLANs, for example) may be indicated. The icons representing network elements may be interconnected by lines, traces, or other symbols representing the patch cords 107, 148 and permanent links 142 that interconnect those network elements. Relevant information from the cable information database 140 may also be displayed for the cabling such as cable identification numbers, cable type, color, and the length of each segment (which may be determined as described above). The results of measurements obtained by the cable diagnostic test function 212 can then be displayed over (or proximate to) the icon or symbol for the network element or cable closest to the location indicated by the fault distance measurement. In some embodiments, the display device 137 may provide any of this information in the form of an augmented reality display. For example, the display device 137 may comprise a mobile computing device (such as a tablet or a wearable headset, for example) that includes indoor and/or navigation capabilities (such as navigation sensors or navigation receivers, for example) to determine its own location within a facility and display information to direct the user to the fault location. Such a mobile implementation of the display device 137 may utilize a wireless link or wireless network to communicate with the system manager 138. In some embodiments, the navigation sensors and receivers may comprise, for example, inertial sensors (for example, accelerometers and/or gyroscopes), dead reckoning sensors, six degrees of freedom (6DF) sensors, satellite or terrestrial navigation signal receivers, or other technology for determining the orientation, attitude, and/or position of the display device 137. The display device 137 may further present an augmented reality display that virtually marks the location of a detected fault as determined by the network integrity monitor 139. As such the display device 137 may take the form of a handheld tablet, or a wearable computing device such as, but not limited to, smart glasses, goggles, or a helmet.

Figure 4:
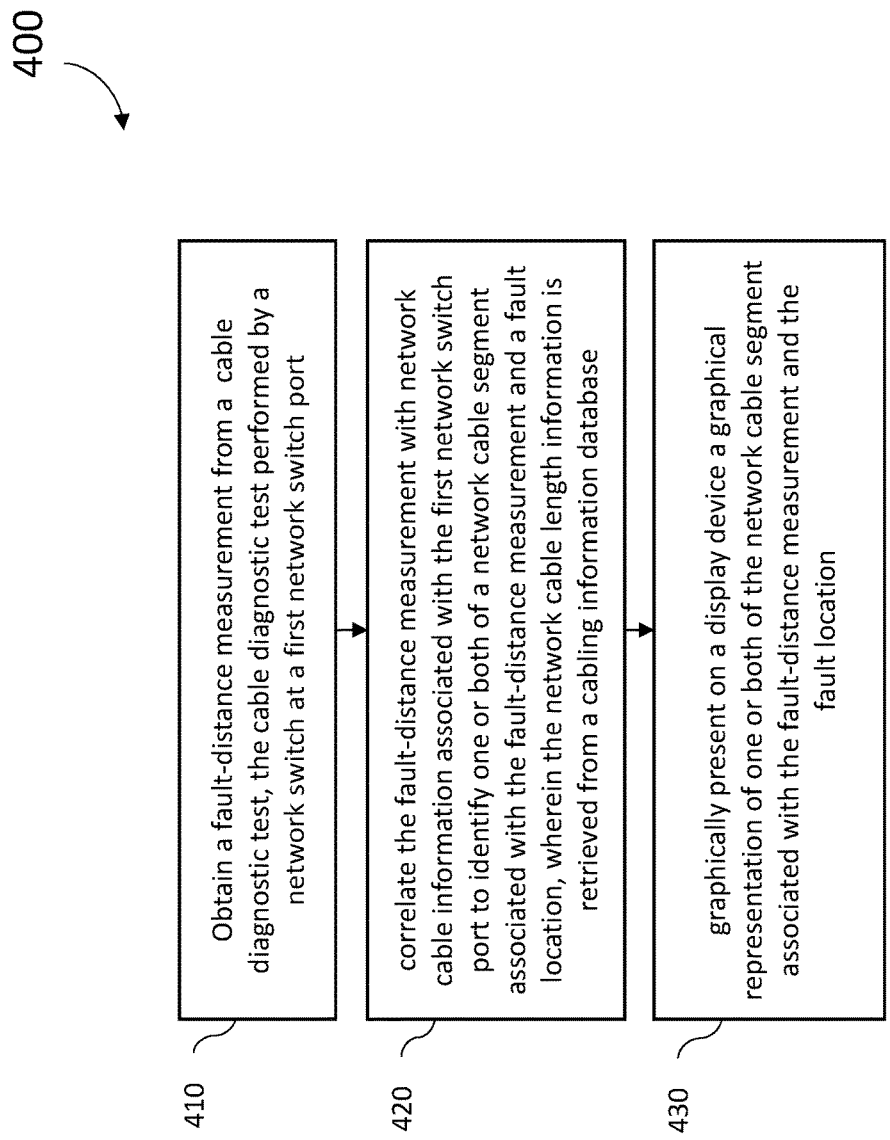
FIGS. 4 and 4A are a flow chart and diagram illustrating another example method embodiment.

Such a process is illustrated in FIG. 4 by the high-level flow chart illustrating an exemplary embodiment of a process 400. It should be understood that the features and elements described herein with respect to the process 400 shown in FIGS. 4 and 4A and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIGS. 4 and 4A may apply to like named or described elements for any of the other figures and embodiments and vice versa.

The embodiment of process 400 shown in FIG. 4 is described here as being implemented using the system 100 of FIG. 1, though it is to be understood that other embodiments can be implemented in other ways. The process begins at 410 with obtaining a fault-distance measurement from a cable diagnostic test, the cable diagnostic test performed by a network switch at a switch port. The fault-distance measurement represents a length of cabling starting from the switch port to a detected cable fault. In one embodiment, the cable diagnostic test is initiated by the network integrity monitor 139 transmitting a test command to the network switch controller 205 via the management software interface 214. The test command instructs the network switch controller 205 to execute the cable diagnostic test function 212, and may specify the specific port 210 of the network switch 110 that is to be tested along with any options, as previously describe above. The method proceeds to 420 with network cable information associated with the first network switch port to identify one or both of a network cable segment associated with the fault-distance measurement and a fault location, wherein the network cable length information is retrieved from a cabling information database. The correlation evaluates the series connection of network cables coupled to the switch ports to identify a network cable segment that the cable length measurement falls within. The method proceeds to 430 with graphically presenting (for example, on the terminal 137) a graphical representation of one or both of the network cable segment associated with the fault-distance measurement and the fault location. In some embodiments, this comprises graphically presenting a cable route for at least the identified network cable segment, wherein the graphical representation graphically indicates the fault location on the graphic representation of the cable route based on the fault-distance measurement. In some embodiments, this comprises graphically presenting a graphical representation of a building floor plan on the display device, wherein the graphical representation graphically indicates the fault location on the graphic representation of the building floor plan based on the fault-distance measurement. The graphical representation graphically indicates a fault location determined based on the fault-distance measurement. In some embodiments, graphically presenting the graphical representation comprises causing a display of a mobile user device to graphically present the graphical representation.

Figure 4A:
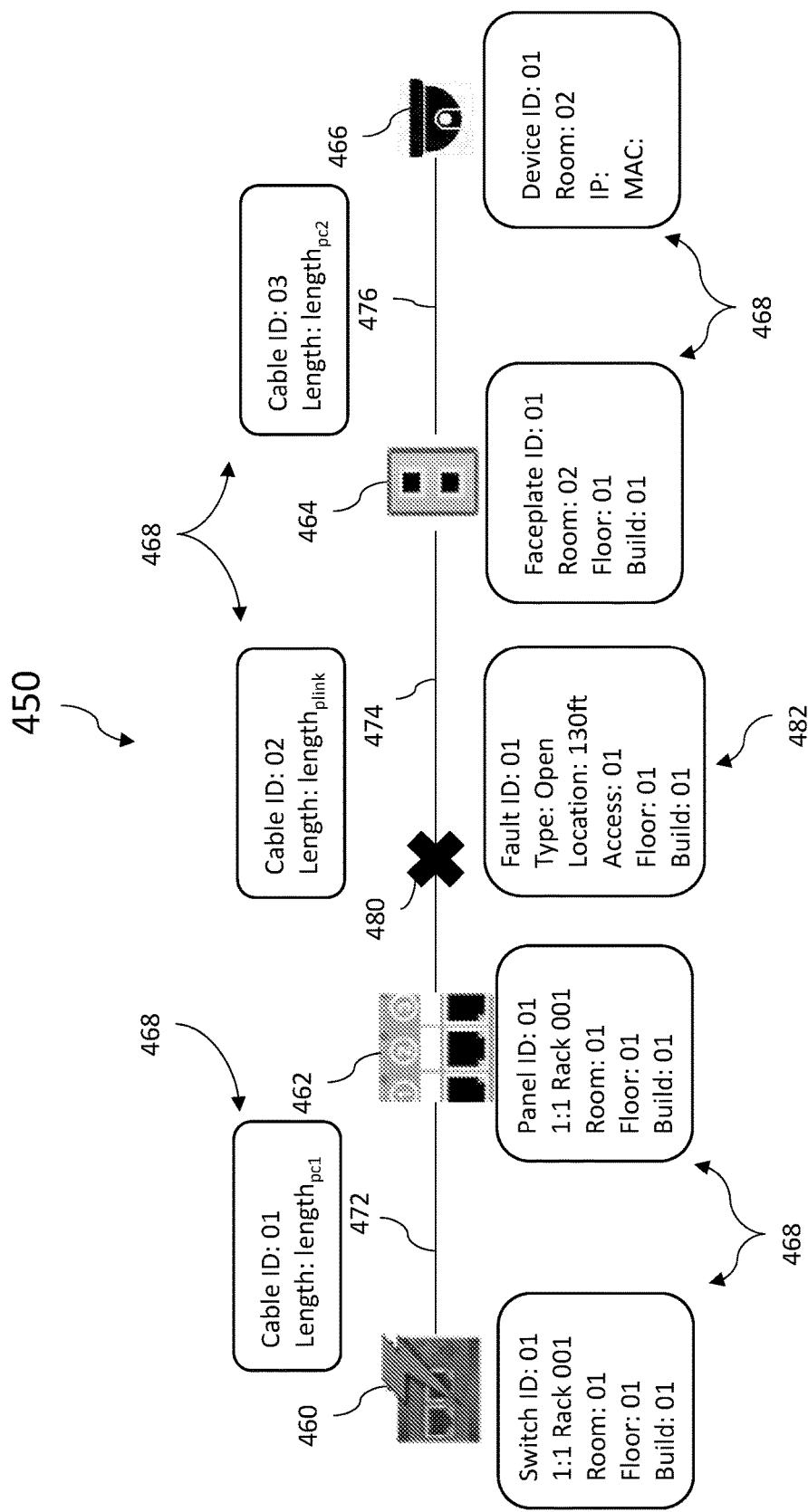

As an example, FIG. 4A illustrates a graphical representation of a cable route 450 for a network circuit that includes a switch icon 460, patching equipment icon 462, wall outlet icon 464 and end user icon 466, interconnected by a first cable trace 472 for a first patch cord, a second cable trace 474 for a permanent link, and a third cable trace 476 for a second patch cord. The network integrity monitor 139 may cause this graphical representation to be displayed, for example, on the display device 137, which may comprise a mobile user device. Additional supplemental information available to the network integrity monitor 139 about each of these elements may further be displayed as shown at 468. An example icon for graphically indicating a fault location on the graphic representation of the cable route is shown at 480. The network integrity monitor 139 may further display supplemental information about the detected fault, as shown at 482, which may include a fault identifier, fault type (e.g. open vs short), the distance of the fault from the switch port as indicated by the fault-distance measurement and/or other location information such an access point (for example, a wall, floor, or ceiling panel) that would provide a technician with access to the fault location.

For example, if the fault distance measurement has a length equal to one-half the length of the first patch cord 107 then a fault symbol may be displayed at a position one-half the length of the first patch cord from the network switch 110. If the fault distance measurement has a length equal to the length of the first patch cord 107 plus one-third of the length of the permanent link 142, then a fault symbol may be displayed at a position one-third the length of the permanent link 142 from the patching equipment 102. If the fault distance measurement has a length equal to the length of the first patch cord 107 plus the length of the permanent link 142, then a fault symbol may be displayed at the position of the outlet assembly 144. These examples are intended as illustrative and not limiting. That is, the fault symbol may be displayed anywhere on the graphical network circuit representation from the switch 110 to the user equipment 188 based on the fault distance measurement.

Given this information, a technician may be dispatch to the location where the fault is expected to be found. In some embodiments, the system manager 138 may overlay the graphical network circuit representation with building floor plan information from a facility database which may be stored in, or otherwise accessible to, the system manager 138. In some embodiments, the building floor plan information may include identification information of specific floor, ceiling, or wall access panels obtained by correlating the estimated location of the faults and the building floor plan.

In some embodiments, after the switch 110, patching equipment 102 and other components of system 100 are deployed and initialized, infrastructure management information for the switch 110 and patching equipment 102 may be synchronized and stored by the network integrity monitor 139 to populate database 140 and other databases with connectivity information for the deployed equipment. For example, in the case where system 100 operates as an AIM, the system manager 138 may automatically discover the switch 110 and establish the link status of each of the port 210, and populate the database 140 with measurements of the permanent link 142 established by field testing. In both AIM and non-AIM implementations, the network integrity monitor 139 may initiate the cable diagnostic test function 212 at the switch 110 in order to establish the lengths of any patch cords 107 coupling the switch 110 to the patching equipment 102, and of any patch cords 148 coupling equipment 148 at the distal ends of permanent links 142 to user equipment 188. In this way, baseline data for the lengths and interconnection of each item of network cabling coupled to the network switch 110 can be collected into database 140 along with which ports 210 they are associated with. Continuous monitoring of network cabling connections and integrity may then be initiated by the network activity monitor 139 for AIM and non-AIM implementations.

For ports 210 having a link-down status (which may be determined from the switch controller 205 as accessed through the management software interface 214, for example), the network activity monitor 139 may conduct scheduled status polls that include cable diagnostic tests in order to monitor for circuit configuration changes by comparing test results to the baseline data. Such monitoring may identify switch ports 210 that have become patched or re-patched, but not connected to active end-user devices and this be used to reconcile patching of ports with undefined equipment connections. For example, the detected length of previously undocumented cabling could be displayed in a trace window presented on the terminal 137. Moreover, switch ports that should be empty per the database 140 may be confirmed as empty from the test results. Alternatively, the network activity monitor 139 may conduct a cable diagnostic test after receiving information from a switch controller 205 that a link status has changed and monitor for circuit configuration changes by comparing test results to the baseline data.

For ports 210 with a link-up status (which may be determined from the switch controller 205 as accessed through the management software interface 214, for example), the network integrity monitor 139 may activate the test function 212 to periodically confirm the full length of the communication channel from the switch 110 up to and including the end-user equipment 188. That is, for a port 210 having a link-up status, end-to-end communication between the port 210 and an end user 188 is active and a fault-distance diagnostic test should return a cable length measurement matching the total length of network cabling associated with that port 210 in the database 140. A deviation from the baseline measurements stored in the database can provide an indication that an unscheduled patching modification has occurred. Alternatively, for network circuits that deliver electric power in addition to data, such a Power-over-Ethernet (PoE) network circuits, a change in cable a length measurement can be used to more accurately assess temperature rises in the cabling from carrying the electric current. In some implementations, initiating a fault-distance diagnostic test on a link-up network circuit can be disruptive and cause error to occur in the transmission of data through the cabling. For this reason, in some embodiments, activation of the cable diagnostic test function 212 for ports 210 with link-up network circuits may be scheduled by the network integrity monitor 139 to occur during periods of low network use, such as after normal business hours, expected periods of low user demand, or at time where network use is not critical. The cable diagnostic test function 212 may be trigged by the network integrity monitor 139 upon discovery of a circuit configuration change.

In some embodiments, the network integrity monitor 139 may trigger activation of the cable diagnostic test function 212 for a port 210 each time a link status change is detected, from link-up to link-down status. This information may provide the network operator with an indication of why the network circuit became inactive. For example, the results may indicate that the full length of cabling, consistent with the baseline measurements stored in the cabling information database 140, is still coupled to the affected port 210, and that the patch cord 148 at the user device 188 end of the cabling appears properly terminated in a network interface port. Such a result would indicate that the end-user device 188 is still connected to the network circuit, but that the end-user device 188 has lost power or is otherwise in a degraded condition for another reason. As described above, if instead the end of the cabling does not appear properly terminated in a network interface port, the measurements obtained by cable diagnostic test function 212 may indicate where a point of disconnect has occurred. For example, a result that the full length of cabling substantially equal to the baseline measurements stored in the cabling information database 140 is connected to a port 210, but appears unterminated, would indicate that the end-user patch cord 148 has become disconnected from the end-user device 188. A result that a length cabling obtained by cable diagnostic test function 212 is only equal to the length of patch cord 107 plus the length of the permanent link 142, would indicate that the end-user patch cord 148 has become disconnected, for example, a wall outlet at outlet assembly 144. A result that a length cabling obtained by cable diagnostic test function 212 is only equal to the length of patch cord 107 would indicate that the patch cord 107 has become disconnected from patching equipment 102. A result that a length cabling obtained by cable diagnostic test function 212 is zero would indicate that the patch cord 107 has become disconnected from the port 210 of network switch 110. As already mentioned above, diagnostic test results can also indicate a fault and possible cable damage, whether an open circuit or short circuit, at mid-span positions along any of the network cables. For example, a result that a length measurement obtained by cable diagnostic test function 212 is longer than the length of patch cord 107, but less than the combined length of patch cord 107 and permanent link 142 would indicate a fault in the network cable of the permanent link 142. For implementations where the permanent link 142 if formed by more than one segment of series connected cables, the length measurement obtained by cable diagnostic test function 212 can indicate which segment has the fault. In each of these cases, the disconnection point may be graphically displayed to a technician or operator on the display device 137 as described above.

In some embodiments, the network integrity monitor 139 may initiate the cable diagnostic test function 212 in conjunction with a work order confirmation process. For example, when a work order is initially created, the network integrity monitor 139 may run the diagnostic test function 212 to confirm whether a port being manipulated by the work order (whether a switch port, patching equipment port, wall outlet or consolidation port, for example) has the initial condition (i.e., either empty or occupied) expected prior to execution of the work order. Similarly, after a technician completes a connect, disconnected or move step of the work order, the run the diagnostic test function 212 can be run to confirm whether the port being manipulated at that step of the work order is in the expected final condition. In some embodiments, the network integrity monitor 139 may access a work order database that details connect and disconnect steps for approved work orders. The technician executing the work order may indicate on the terminal device 139 the step of the work order they just completed, which triggers the network integrity monitor 139 to run the diagnostic test function 212 on the network switch port 210 associated with the affected circuit in order to confirm proper execution of the work order step and/or refresh the cable length data associated with that port 210 in the cabling information database 140.

In some embodiments, when ad-hoc (that is, unscheduled) patching events occur, the network integrity monitor 139 may execute the diagnostic test function 212 to attempt to discern the what change to equipment interconnection has occurred. For example, if a change is detected in the length of cabling coupled to a port 210, the difference in measured length as compared to the expected length (per database 140) may be compared to other path lengths on that same switch 110 or patching equipment 102. For example, network integrity monitor 139 may run a correlation of the difference in measured length to path lengths on that same switch 110 or patching equipment 102 to determine a most likely patching equipment port now connected to that particular switch port that should be empty. In some embodiments, network integrity monitor 139 may trigger running of the diagnostic test function 212 upon the system manager 138 determining that a link-up is detected on a switch port 210 that should be link-down.

In some embodiments, the network switch controller 205 can execute the cable diagnostic test function 212 for a selected switch port 210 as part of the initial handshake between the network switch 110 and the end user equipment 188. Such an embodiment would have the advantage of avoiding communications disruptions of an active channel. Further, the network switch controller 205 can be sure at that the channel is complete from the network switch 110 to the end user equipment 188 at the point in time that the test is conducted. FIG. 5 illustrates one alternate process 500 for such an embodiment which may be implemented by the network integrity monitor 139. Process 500 may be utilized as an alternate method to establish relevant cable lengths for both the permanent links 142 and patch cables 107, 148 coupled to the port 210 of a network switch 110. It should be understood that the features and elements described herein with respect to the method or process 500 shown in FIG. 5 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 5 may apply to like named or described elements for any of the other figures and embodiments and vice versa. The information obtained from this process 500 may be used to populate the cable information database 140 by associating the relevant cable lengths with the port 210, and including an indication of the order in which the patch cables 107, 148 and permanent links 142 are series connected to the port 210.

The process begins as 510 with performing a handshake process in response to detecting an installation of an end user equipment device to a first network switch port of a network switch. For example, the handshake process may comprise a Transmission Control Protocol (TCP) handshake used to negotiate one or more network socket connections prior to commencing the communication of network traffic.

The process 500 proceeds to 520 with, during the handshake process, triggering a port fault-distance diagnostic test measurement performed by the network switch to determining a length of the total cabling coupled to the first network switch port. That is, this test would encompass a total length of the complete channel including the length of the first patch cord 107 (shown in FIG. 3A as "$length_{pc1}$"), the length for the permanent link 142 (shown in FIG. 3A as "$length_{plink}$"), and the length for the second patch cord 148 (shown in FIG. 3A as "$length_{pc2}$"). In one embodiment, during the handshake process, the network integrity monitor 139 transmits a test command to network switch controller 205 via the management software interface 214. The test command instructs the network switch controller 205 to execute the cable diagnostic test function 212 for the port 210 of the network switch 110 that is to be tested. The test signal transmitted by the test function 212 would pass through the channel to reach the distal end of the end user patch cord 148. From the reflected signal received back at the port 210 under test, the test function 212 determines the total length of network cabling for the channel. The network integrity monitor 139 can then query the results of this cable diagnostic test from network switch controller 205 via the management software interface 214.

The process 500 proceeds to 530 with determining a length of a permanent link of network cable coupled to the first network switch port of the network switch. This length for the permanent link is shown in FIG. 3A as "$length_{plink}$" which spans the distance between the patching equipment 102 and outlet assembly 144. The length of the permanent link of network cable may in some embodiments be determined by obtaining previous field test measurements performed at the time the permanent link was installed or based on field test measurements performed at another time. In some embodiments, the results of the field test measurements would be stored into the cabling information database 140 and therefore made accessible to the network integrity monitor 139. It should be understood that in cases where the permanent link 142 should comprise a plurality of series connected physical network cabling segments, each of those physical network cabling segments may be individually field tested and the results of those individual tests stored in the cabling information database 140. In such cases, the length for the permanent link ($length_{plink}$) determined at 530 may comprise the sum of the lengths of the plurality of series connected physical network cabling segments as determined by the field testing.

The process 500 proceeds to 540 with calculating patch cord length estimates based on a difference between the length of the total cabling and the permanent link length. For example, at 530, the length for the permanent link ($length_{plink}$) is obtained, and at 520, the total channel length ($length_{channel}=(length_{pc1}+length_{plink}+length_{pc2})$) is obtained. The patch cord lengths ($length_{pc1}$ and $length_{pc2}$) are still unknown. However, an estimate of the patch cord lengths can be obtained using ($length_{channel}-length_{plink}$)/2. For example, where $length_{channel}$=45 m and $length_{plink}$=30 m, then $length_{pc1}$ and $length_{pc2}$ can be estimated as 7.5 m each. The information thus obtained for may be used to populate the cable information database 140. The process 500 proceeds to 540 with associating a series connection of the first patch cord, the permanent link, and the second patch cord with the switch port in the cable information database 140. Once the lengths and associations are stored in the cable information database 140, network integrity monitor 139 may initiate subsequent test using the cable diagnostic test function 212 to monitor the integrity of network cabling coupled to the network switch 110 as described above.

With this information obtained at 520, 530 and 540 the network integrity monitor 139 can subsequently activate the cable diagnostic test function 212 and perform calculations identify the circuit segment (i.e., the patching equipment patch cord 107, the permanent link 142, or the end user patch cord 148) that has a fault.

For example, when the end user patch cord 148 is disconnected from end user equipment 188, activating the cable diagnostic test function 212 would be expected to yield a total length of about $length_{channel}$, and the cable status will be open. If instead the patching equipment patch cord 107 is disconnected from the network switch 110 port, activating the cable diagnostic test function 212 will yield a length equal to 0, and the cable status will be open. Other fault conditions may similarly be identified.

For example, when the patching equipment patch cord 107 is disconnected from passive patching equipment 102, activating the cable diagnostic test function 212 can be expected to yield a length a standard patch cable (e.g., about 5 m), and the cable status will be open. Because the cable test yields a result less than $length_{channel}$ but not equal to 0, and less than $length_{plink}$ then it can be inferred that the patch cord 107 is disconnected from patching equipment 102.

When the patching equipment patch cord 107 is disconnected from an intelligent patching equipment 102, can again be expected to yield a length a standard patch cable (e.g., about 5 m), and the cable status will be open. The AIM functionality 104 in that item of patching equipment 102 will sense the patch cord removal event confirming that the patch cord 107 is disconnected from patching equipment 102.

When an end user patch cord 148 is disconnected from an outlet 144, activating the cable diagnostic test function 212 can be expected to yield a length of about $length_{plink}$ plus the length of a standard patch cable (e.g., about 5 m), and the cable status will be open. Because the cable test yields a result less than $length_{channel}$ but not equal to 0, and greater than $length_{plink}$ then it can be inferred that the patch cord 148 is disconnected from the outlet 144.

In the event that the permanent link 142 is inadvertently cut, activating the cable diagnostic test function 212 can be expected to yield a length of about ½ $length_{plink}$ plus the length of a standard patch cable (e.g., about 5 m), and the cable status will be open. Because the cable test yields a result less than $length_{channel}$ but not equal to 0, and less than $length_{plink}$ but greater than the length of a standard patch cable (e.g., about 5 m), it can be inferred that the permanent link 142 has been cut.

It should be understood that for any of the embodiments discussed above, instead of outputting graphical displays to indicate fault locations on network cable segments, fault information and the determined fault location can be identified and reported as output from the system manager and/or network integrity monitor using other reporting mechanisms, such as but not limited to, sending reports via an application programming interface (API), a messaging service, such as email, Short Message Service (SMS), Multimedia Messaging Service (MMS), or the like.

EXAMPLE EMBODIMENTS

Example 1 includes a system manager for a network that includes a network switch coupled to a first item of patching equipment, the system manager comprising: at least one processor configured to execute software, the software comprising a network integrity monitor; wherein the network integrity monitor controls a cable diagnostic test function to obtain a fault-distance measurement for a first switch port of the network switch; wherein the network integrity monitor correlates the fault-distance measurement with network cable length information associated with the first network switch port to identify one or both of a network cable segment associated with the fault-distance measurement and a fault location; wherein the network cable length information is retrieved from a cabling information database; and wherein the network integrity monitor produces an output identifying one or both of the network cable segment associated with the fault-distance measurement and the fault location to be displayed on a display device Example 2 includes the system manager of example 1, wherein the network integrity monitor causes a graphical representation of one or both of the network cable segment associated with the fault-distance measurement and the fault location to be displayed on a display device.

Example 3 includes the system manager of any of examples 1-2, wherein the network integrity monitor causes a graphical representation of a cable route for at least the identified network cable segment to be displayed on a display device, wherein the graphical representation graphically indicates a fault location on the graphic representation of the cable route based on the fault-distance measurement.

Example 4 includes the system manager of example 3, wherein the graphical representation of the cable route comprises an icon representing at least one of: the network switch; the first item of patching equipment; an outlet assembly; and end-user equipment.

Example 5 includes the system manager of example 4, wherein the outlet assembly comprises either a network consolidation point or a network outlet.

Example 6 includes the system manager of any of examples 1-5, wherein the network integrity monitor causes a graphical representation of a building floor plan on a display device, wherein the graphical representation graphically indicates a fault location on the graphic representation of the building floor plan based on the fault-distance measurement.

Example 7 includes the system manager of any of examples 1-6, further comprising a mobile device wirelessly coupled to the system manager, wherein the output is displayed on a display device of the mobile device.

Example 8 includes the system manager of any of examples 1-7, wherein the network cable information comprises cable length information for a series connection of a first patch cord, a permanent link, and a second patch cord.

Example 9 includes the system manager of example 8, wherein the network switch is coupled to the first item of patching equipment by the first patch cord, wherein the first item of patching equipment is coupled to other equipment by the permanent link, wherein the other equipment is coupled to an end-user device by the second patch cord.

Example 10 includes the system manager of any of examples 8-9, wherein the cabling information database obtains and stores results of field test measurements that include a cable length of the permanent link.

Example 11 includes the system manager of any of examples 8-10, wherein the network integrity monitor controls the cable diagnostic test function in the network switch to obtain one or more cable length measurements from the first switch port and calculates either a cable length of the first patch cord, or a cable length of the second patch cord, based on the one or more cable length measurements from the first switch port and the cable length of the permanent link.

Example 12 includes the system manager of any of examples 1-11, wherein the network integrity monitor accesses the cable diagnostic test function through a management software interface in the network switch.

Example 13 includes the system manager of any of examples 1-12, wherein the network integrity monitor is configured to receive link status information for the first switch port from the network switch, wherein the network integrity monitor is configured to initiate activation of the cable diagnostic test function in the network switch in response to a change in link status of the first switch port.

Example 14 includes the system manager of any of examples 1-13, wherein the network integrity monitor is configured to initiate activation of the cable diagnostic test function in the network switch in response to a reported completion of either one or more steps of a work order by a field technician or ad-hoc connectivity changes.

Example 15 includes the system manager of any of examples 1-14, wherein the network integrity monitor further controls the cable diagnostic test function to determine at least one of: when the first switch port is coupled to an end-user device based on a measurement from the cable diagnostic test function; determine when the first switch port is occupied by a patch cable based on a measurement of the first switch port from the cable diagnostic test function; or when a port of an outlet assembly is occupied by a patch cable based on a measurement of the first switch port from the cable diagnostic test function.

Example 16 includes the system manager of any of examples 1-15, wherein the cable diagnostic test function performs either a time domain fault-distance diagnostic test or a frequency domain fault-distance diagnostic test.

Example 17 includes the system manager of any of examples 1-16, further comprising a display device, wherein the display device generates an augmented reality graphical representation of one or both of the network cable segment associated with the fault-distance measurement and the fault location.

Example 18 includes the system manager of any of examples 1-17, further comprising a display device, wherein the display device comprises navigation sensors or navigation receivers and generates an augmented reality graphical representation that directs a user to one or both of the network cable segment associated with the fault-distance measurement and the fault location.

Example 19 includes a method for network integrity monitoring, the method comprising: obtaining a fault-distance measurement from a cable diagnostic test, the cable diagnostic test performed at a first network switch port of the network switch; correlating the fault-distance measurement with network cable information associated with the first network switch port to identify one or both of a network cable segment associated with the fault-distance measurement and a fault location, wherein the network cable length information is retrieved from a cabling information database; and outputting an identification of one or both of the network cable segment associated with the fault-distance measurement and the fault location.

Example 20 includes the method of example 19, wherein outputting the identification comprises presenting a graphical representation of one or both of the network cable segment associated with the fault-distance measurement and the fault location.

Example 21 includes the method of any of examples 19-20, further comprising: graphically presenting on a display device graphical representation of a cable route for at least the identified network cable segment, wherein the graphical representation graphically indicates the fault location on the graphic representation of the cable route based on the fault-distance measurement.

Example 22 includes the method of example 21, wherein the graphical representation of the cable route comprises an icon representing at least one of: the network switch; the first item of patching equipment; an outlet assembly; and end-user equipment.

Example 23 includes the method of example 22, wherein the outlet assembly comprises either a network consolidation point or a network outlet.

Example 24 includes the method of any of examples 19-23, further comprising: graphically presenting on a display device a graphical representation of a building floor plan on the display device, wherein the graphical representation graphically indicates the fault location on the graphic representation of the building floor plan based on the fault-distance measurement.

Example 25 includes the method of any of examples 19-24, further comprising causing a display of a mobile user device to graphically present the graphical representation of one or both of the network cable segment associated with the fault-distance measurement and the fault location Example 26 includes the method of any of examples 19-25, wherein the network cable information comprises cable length information for a series connection of a first patch cord, a permanent link, and a second patch cord.

Example 27 includes the method of example 26, wherein the cabling information database obtains and stores results of field test measurements that include a cable length of the permanent link.

Example 28 includes the method of any of examples 26-27, further comprising: determining a length of a first patch cord between network switch port and patching equipment port based on a first cable diagnostic test measurement performed by the network switch and a length of the permanent link; determining a length of second patch cord between an outlet assembly and end user equipment based on a second cable diagnostic test measurement performed by the network switch, the length of a first patch cord, and the length of the permanent link; and associating a series connection of the first patch cord, the permanent link, and the second patch cord with the switch port in the cable information database.

Example 29 includes the method of any of examples 26-28, further comprising: performing a handshake process in response to detecting an installation of an end user equipment device to the first network switch port of the network switch; during the handshake process, triggering a port fault-distance diagnostic test measurement performed by the network switch to determining a length of the total cabling coupled to the first network switch port; determining a length of the permanent link coupled to the first network switch port of the network switch; and calculating patch cord length estimates for the first patch cord and second patch cord based on a difference between the length of the total cabling and the length of the permanent link length.

Example 30 includes the method of any of examples 19-29, further comprising: initiating activation of the cable diagnostic test function in the network switch in response to a change in link status of the first network switch port.

Example 31 includes the method of any of examples 19-30, further comprising: initiating activation of the cable diagnostic test function in the network switch in response to a reported completion of either one or more steps of a work order by a field technician, or an ad-hoc connectivity change.

Example 32 includes the method of any of examples 19-31, further comprising: determining when the first network switch port is coupled to an end-user device based on a measurement from the cable diagnostic test.

Example 33 includes the method of any of examples 19-32, further comprising: determining when the first network switch port is occupied by a patch cable based on a measurement of the first network switch port from the cable diagnostic test.

Example 34 includes the method of any of examples 19-33, wherein the cable diagnostic test comprises either a time domain fault-distance diagnostic test or a frequency domain fault-distance diagnostic test.

Example 35 includes the method of any of examples 19-34, further comprising: generating on a display device an augmented reality graphical representation of one or both of the network cable segment associated with the fault-distance measurement and the fault location.

Example 36 includes the method of any of examples 19-35, further comprising: generating on a display device an augmented reality graphical representation that directs a user to one or both of the network cable segment associated with the fault-distance measurement and the fault location; wherein the display device comprises navigation sensors or navigation receivers.

Example 37 includes a method for network integrity monitoring, the method comprising: performing a handshake process in response to detecting an installation of an end user equipment device to the first network switch port of the network switch; during the handshake process, triggering a port fault-distance diagnostic test measurement performed by the network switch to determining a length of the total cabling coupled to the first network switch port; determining a length of the permanent link coupled to the first network switch port of the network switch; and calculating patch cord length estimates for the first patch cord and second patch cord based on a difference between the length of the total cabling and the length of the permanent link length; and storing in a cabling information database as network cable length information associated with the first network switch port: the network cable length information, the length of the permanent link, and the length of the total cabling.

Example 38 includes the method of example 37, further comprising: monitoring a link status of the first network switch port; triggering a second port fault-distance diagnostic test measurement in response to detecting the change in the link status of the first network switch port; correlating the second fault-distance diagnostic test measurement with the network cable information associated with the first network switch port to identify one or both of a network cable segment associated with the fault-distance measurement and a fault location; and outputting an identification of one or both of the network cable segment associated with the fault-distance measurement and the fault location.

In various alternative embodiments, system and/or device elements, method steps, or example implementations described throughout this disclosure (such as any of the system manager, network integrity monitor, network switch, fault-distance diagnostic test function, patching equipment, end user equipment, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High Speed Integrated Circuit (VHSIC) Hardware Description Language (VHDL).

As used herein, terms such as "controller", "interface", "manager", "switch", "patching equipment", "terminal", "end-user equipment", "network integrity monitor", "fault-distance diagnostic test function", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system manager for a network that includes a network switch, the system manager comprising:
   at least one processor configured to execute software, the software comprising a network integrity monitor;
   wherein the network integrity monitor controls a cable diagnostic test function to obtain a fault-distance measurement for a first switch port of the network switch;
   wherein the network integrity monitor correlates the fault-distance measurement with network cable length information associated with the first network switch port to identify one or both of a network cable segment associated with the fault-distance measurement and a fault location;
   wherein the network cable length information is retrieved from a cabling information database; and
   wherein the network integrity monitor produces an output identifying one or both of the network cable segment associated with the fault-distance measurement and the fault location to be displayed on a display device.

2. The system manager of claim 1, wherein the network integrity monitor causes a graphical representation of one or both of the network cable segment associated with the fault-distance measurement and the fault location to be displayed on a display device.

3. The system manager of claim 1, wherein the network integrity monitor causes a graphical representation of a cable route for at least the identified network cable segment to be displayed on a display device, wherein the graphical representation graphically indicates a fault location on the graphic representation of the cable route based on the fault-distance measurement.

4. The system manager of claim 3, wherein the graphical representation of the cable route comprises an icon representing at least one of:
   the network switch;
   a first item of patching equipment;
   an outlet assembly; and
   end-user equipment.

5. The system manager of claim 4, wherein the outlet assembly comprises either a network consolidation point or a network outlet.

6. The system manager of claim 1, wherein the network integrity monitor causes a graphical representation of a building floor plan on a display device, wherein the graphical representation graphically indicates a fault location on the graphic representation of the building floor plan based on the fault-distance measurement.

7. The system manager of claim 1, further comprising a mobile device wirelessly coupled to the system manager, wherein the output is displayed on a display device of the mobile device.

8. The system manager of claim 1, wherein the network cable information comprises cable length information for a series connection of a first patch cord, a permanent link, and a second patch cord.

9. The system manager of claim 8, wherein the network switch is coupled to the first item of patching equipment by the first patch cord, wherein a first item of patching equipment is coupled to other equipment by the permanent link, wherein the other equipment is coupled to an end-user device by the second patch cord.

10. The system manager of claim 8, wherein the cabling information database obtains and stores results of field test measurements that include a cable length of the permanent link.

11. The system manager of claim 8, wherein the network integrity monitor controls the cable diagnostic test function in the network switch to obtain one or more cable length measurements from the first switch port and calculates either a cable length of the first patch cord, or a cable length of the second patch cord, based on the one or more cable length measurements from the first switch port and the cable length of the permanent link.

12. The system manager of claim 1, wherein the network integrity monitor accesses the cable diagnostic test function through a management software interface in the network switch.

13. The system manager of claim 1, wherein the network integrity monitor is configured to receive link status information for the first switch port from the network switch, wherein the network integrity monitor is configured to initiate activation of the cable diagnostic test function in the network switch in response to a change in link status of the first switch port.

14. The system manager of claim 1, wherein the network integrity monitor is configured to initiate activation of the cable diagnostic test function in the network switch in response to a reported completion of either one or more steps of a work order by a field technician or ad-hoc connectivity changes.

15. The system manager of claim 1, wherein the network integrity monitor further controls the cable diagnostic test function to determine at least one of:
  when the first switch port is coupled to an end-user device based on a measurement from the cable diagnostic test function;
  determine when the first switch port is occupied by a patch cable based on a measurement of the first switch port from the cable diagnostic test function; or
  when a port of an outlet assembly is occupied by a patch cable based on a measurement of the first switch port from the cable diagnostic test function.

16. The system manager of claim 1, wherein the cable diagnostic test function performs either a time domain fault-distance diagnostic test or a frequency domain fault-distance diagnostic test.

17. The system manager of claim 1, further comprising a display device, wherein the display device generates an augmented reality graphical representation of one or both of the network cable segment associated with the fault-distance measurement and the fault location.

18. The system manager of claim 1, further comprising a display device, wherein the display device comprises navigation sensors or navigation receivers and generates an augmented reality graphical representation that directs a user to one or both of the network cable segment associated with the fault-distance measurement and the fault location.

19. A method for network integrity monitoring, the method comprising:
  obtaining a fault-distance measurement from a cable diagnostic test, the cable diagnostic test performed at a first network switch port of the network switch;
  correlating the fault-distance measurement with network cable information associated with the first network switch port to identify one or both of a network cable segment associated with the fault-distance measurement and a fault location, wherein the network cable length information is retrieved from a cabling information database; and
  outputting an identification of one or both of the network cable segment associated with the fault-distance measurement and the fault location.

20. The method of claim 19, wherein outputting the identification comprises presenting a graphical representation of one or both of the network cable segment associated with the fault-distance measurement and the fault location.

21. The method of claim 19, further comprising:
  graphically presenting on a display device graphical representation of a cable route for at least the identified network cable segment, wherein the graphical representation graphically indicates the fault location on the graphic representation of the cable route based on the fault-distance measurement.

22. The method of claim 21, wherein the graphical representation of the cable route comprises an icon representing at least one of:
  the network switch;
  a first item of patching equipment;
  an outlet assembly; and
  end-user equipment.

23. The method of claim 22, wherein the outlet assembly comprises either a network consolidation point or a network outlet.

24. The method of claim 19, further comprising
  graphically presenting on a display device a graphical representation of a building floor plan on the display device, wherein the graphical representation graphically indicates the fault location on the graphic representation of the building floor plan based on the fault-distance measurement.

25. The method of claim 19, further comprising causing a display of a mobile user device to graphically present the graphical representation of one or both of the network cable segment associated with the fault-distance measurement and the fault location.

26. The method of claim 19, wherein the network cable information comprises cable length information for a series connection of a first patch cord, a permanent link, and a second patch cord.

27. The method of claim 26, wherein the cabling information database obtains and stores results of field test measurements that include a cable length of the permanent link.

28. The method of claim 26, further comprising:
  determining a length of a first patch cord between a network switch port and a patching equipment port based on a first cable diagnostic test measurement performed by the network switch and a length of the permanent link;
  determining a length of second patch cord between an outlet assembly and end user equipment based on a second cable diagnostic test measurement performed by the network switch, the length of a first patch cord, and the length of the permanent link; and
  associating a series connection of the first patch cord, the permanent link, and the second patch cord with the switch port in the cable information database.

29. The method of claim 26, further comprising:
  performing a handshake process in response to detecting an installation of an end user equipment device to the first network switch port of the network switch;
  during the handshake process, triggering a port fault-distance diagnostic test measurement performed by the network switch to determining a length of the total cabling coupled to the first network switch port;
  determining a length of the permanent link coupled to the first network switch port of the network switch; and
  calculating patch cord length estimates for the first patch cord and second patch cord based on a difference between the length of the total cabling and the length of the permanent link.

30. The method of claim 19, further comprising:
  initiating activation of the cable diagnostic test function in the network switch in response to a change in link status of the first network switch port.

31. The method of claim 19, further comprising:
  initiating activation of the cable diagnostic test function in the network switch in response to a reported completion of either one or more steps of a work order by a field technician, or an ad-hoc connectivity change.

32. The method of claim 19, further comprising:
  determining when the first network switch port is coupled to an end-user device based on a measurement from the cable diagnostic test.

33. The method of claim 19, further comprising:
determining when the first network switch port is occupied by a patch cable based on a measurement of the first network switch port from the cable diagnostic test.

34. The method of claim 19, wherein the cable diagnostic test comprises either a time domain fault-distance diagnostic test or a frequency domain fault-distance diagnostic test.

35. The method of claim 19, further comprising: generating on a display device an augmented reality graphical representation of one or both of the network cable segment associated with the fault-distance measurement and the fault location.

36. The method of claim 19, further comprising: generating on a display device an augmented reality graphical representation that directs a user to one or both of the network cable segment associated with the fault-distance measurement and the fault location;
wherein the display device comprises navigation sensors or navigation receivers.

37. A method for network integrity monitoring, the method comprising:
performing a handshake process in response to detecting an installation of an end user equipment device to a first network switch port of a network switch;
during the handshake process, triggering a port fault-distance diagnostic test measurement performed by the network switch to determining a length of the total cabling coupled to the first network switch port;
determining a length of a permanent link coupled to the first network switch port of the network switch; and
storing in a cabling information database as network cable length information associated with the first network switch port: the length of the permanent link, and the length of the total cabling.

38. The method of claim 37, further comprising:
monitoring a link status of the first network switch port;
triggering a second port fault-distance diagnostic test measurement in response to detecting the change in the link status of the first network switch port;
correlating the second fault-distance diagnostic test measurement with the network cable information associated with the first network switch port to identify one or both of a network cable segment associated with the fault-distance measurement and a fault location; and
outputting an identification of one or both of the network cable segment associated with the fault-distance measurement and the fault location.

39. The method of claim 37, further comprising:
calculating patch cord length estimates for a first patch cord and a second patch cord based on a difference between the length of the total cabling and the length of the permanent link length.

* * * * *